UNITED STATES PATENT OFFICE.

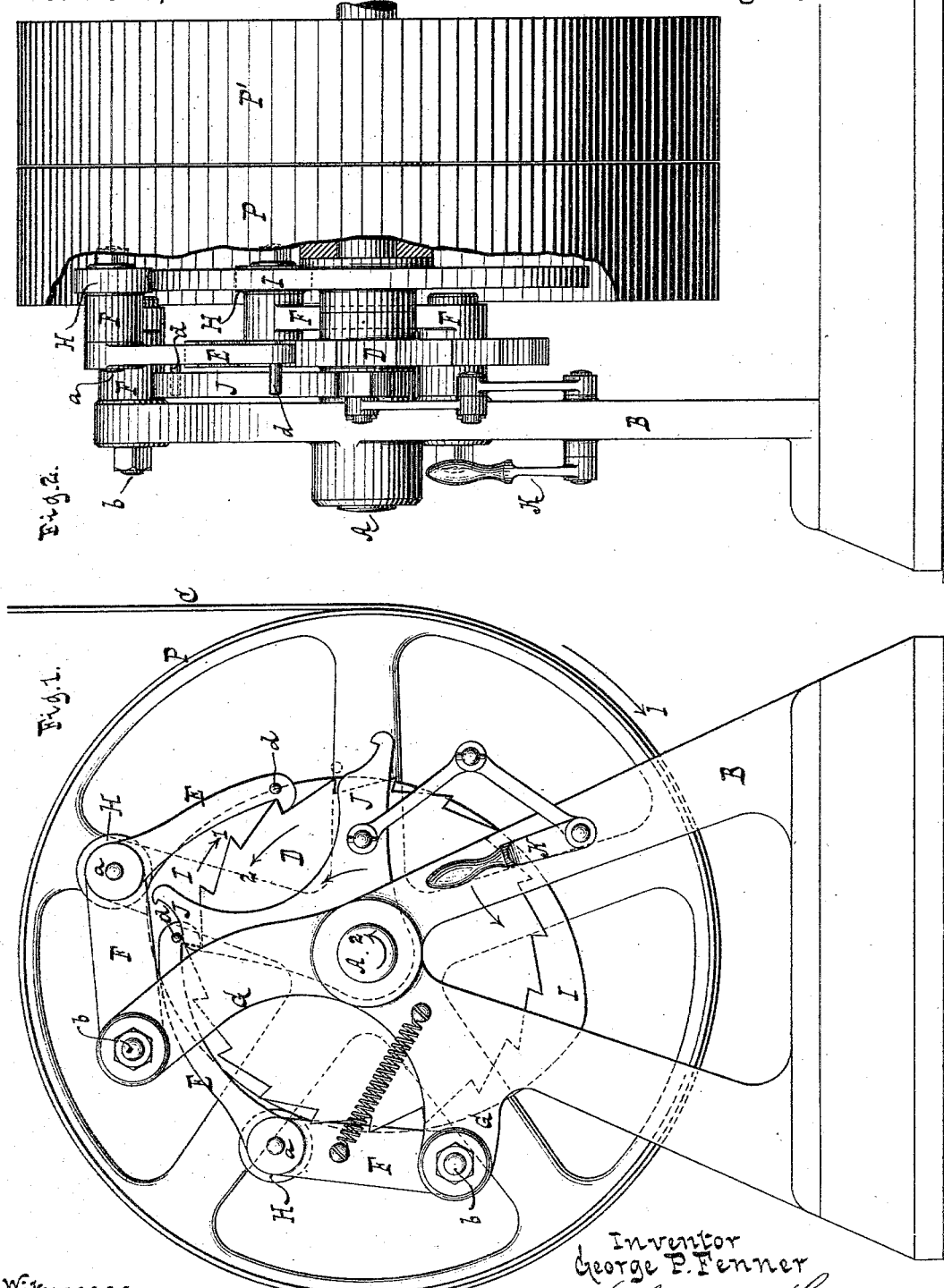

GEORGE P. FENNER, OF NEW LONDON, CONNECTICUT.

DEVICE FOR CONVERTING MOTION.

SPECIFICATION forming part of Letters Patent No. 303,140, dated August 5, 1884.

Application filed June 19, 1884. (No model.)

*To all whom it may concern:*

Be it known that I, GEORGE P. FENNER, a citizen of the United States, residing at New London, in the county of New London and State of Connecticut, have invented new and useful Improvements in Devices for Converting Motion, of which the following is a specification.

This invention consists in the combination, with a shaft, of a pulley mounted loosely upon the shaft, a belt or equivalent device for driving the pulley, a ratchet-wheel mounted firmly upon the shaft, and one or more pawls which engage with the ratchet-wheel, and which are actuated by a cam or equivalent means secured to the pulley, so that by the action of said pawl or pawls upon the ratchet-wheel the shaft is caused to turn in a direction opposite to that in which the pulley revolves; also, in the combination with the shaft, the fast pulley, and the loose pulley, of a cam secured to the loose pulley, a ratchet-wheel mounted firmly on the shaft, and one or more pawls, which engage with the ratchet-wheel and are actuated by the cam, for imparting to the shaft a motion in a direction opposite to that in which the same is moved by the fast pulley.

My invention is illustrated in the accompanying drawings, in which Figure 1 represents a side view. Fig 2 is a front view partly in section.

Similar letters indicate corresponding parts.

In the drawings, the letter A designates a shaft, which has its bearings in suitable standards or frames, B, (one only being shown in the drawings.) On this shaft are mounted two pulleys, P P′, one fast and the other loose. A belt, C, serves to impart motion to these pulleys, and when the belt is thrown upon the loose pulley P, this pulley turns in the direction of arrow 1, Fig. 1. On the shaft A is firmly mounted a ratchet-wheel, D, and with this ratchet-wheel engages one or more pawls, E. In the example illustrated by the drawings, I have shown two pawls, which are secured by pivots *a* to the levers F, and these levers are connected to arms G of the frame by means of pivots *b*, and on the pivots *a* are mounted rollers H, which are in the path of a cam, I. This cam is firmly secured to the arms or to the hub of the loose pulley P, so that it revolves with the same in the direction of arrow 1 whenever the belt is thrown upon the loose pulley. As the cam revolves, it acts upon the roller-studs H, and by this action the ratchet-wheel D, together with the shaft A, is turned in the direction of arrows 2, or in a direction opposite to that in which the fast pulley would turn the shaft whenever the belt is thrown upon said fast pulley. If two pawls are used, as shown in the drawings, the reverse motion imparted to the shaft is equal to four teeth of the ratchet-wheel for every revolution of the loose pulley; and it will be readily understood that the amount of the reverse motion imparted to the shaft for each revolution of the loose pulley can be diminished or increased by reducing or increasing the number of the pawls, or by changing the shape of the cam. Before this belt is thrown upon the fast pulley, the pawls E must be thrown out of gear with the ratchet wheel D. For this purpose I use a bell-crank lever, J, which is mounted loosely on the shaft A, and the position of which is governed by a hand-lever, K. By turning this hand-lever in the direction of the arrow marked near it in Fig. 1, the bell-crank lever J is turned in the direction of the arrow marked on it in Fig. 1, and as the ends of the same are brought to bear upon pins *d*, projecting from the pawls, said pawls are thrown out of gear with the ratchet-wheel. In practice, the bell-crank lever J may be connected with the belt-shipper in such a manner that whenever the belt is moved on the fast pulley the pawls are thrown out of gear, and whenever the belt is moved on the loose pulley the pawls are free to drop in gear with the ratchet-wheel.

It will be readily understood from the above description, that in place of the cam I, simple studs (one or more) may be employed, which project from the arms of the loose pulley and act upon the roller-studs H. It will also be seen that the levers F, which carry the pawls, may be placed in positions different from those shown in the drawings, and that they may be subjected to the action of springs which have a tendency to draw the roller-studs H inward toward the cam I.

What I claim as new, and desire to secure by Letters Patent, is—

1. The combination, with a shaft, of a pulley mounted loosely upon the shaft, a belt or equivalent device for turning the pulley, a ratchet-wheel mounted firmly upon the shaft, and one or more pawls which engage with the ratchet-wheel and which are actuated by a cam or equivalent device secured to the pulley for imparting to the shaft a reverse motion, as set forth.

2. The combination, substantially as hereinbefore described, with the shaft, of the pulley mounted loosely upon the shaft, the belt for driving the pulley, the ratchet-wheel mounted firmly upon the shaft, the pawl or pawls which engage with the ratchet-wheel, the cam or equivalent device secured to the pulley and acting on the pawls, and means, substantially as herein described, for throwing the pawl or pawls out of gear with the ratchet-wheel.

3. The combination, substantially as hereinbefore described, with the shaft, of the fast pulley, the loose pulley, the cam or equivalent device secured to the loose pulley, the ratchet-wheel mounted firmly on the shaft, and one or more pawls, which are actuated by the cam for imparting to the shaft from the loose pulley a motion in a direction opposite to that in which the same is moved by the fast pulley.

In testimony whereof I have hereunto set my hand and seal in the presence of two subscribing witnesses.

GEO. P. FENNER. [L. S.]

Witnesses:
E. T. BROWN,
GEO. COLFAX.